Figure 1:
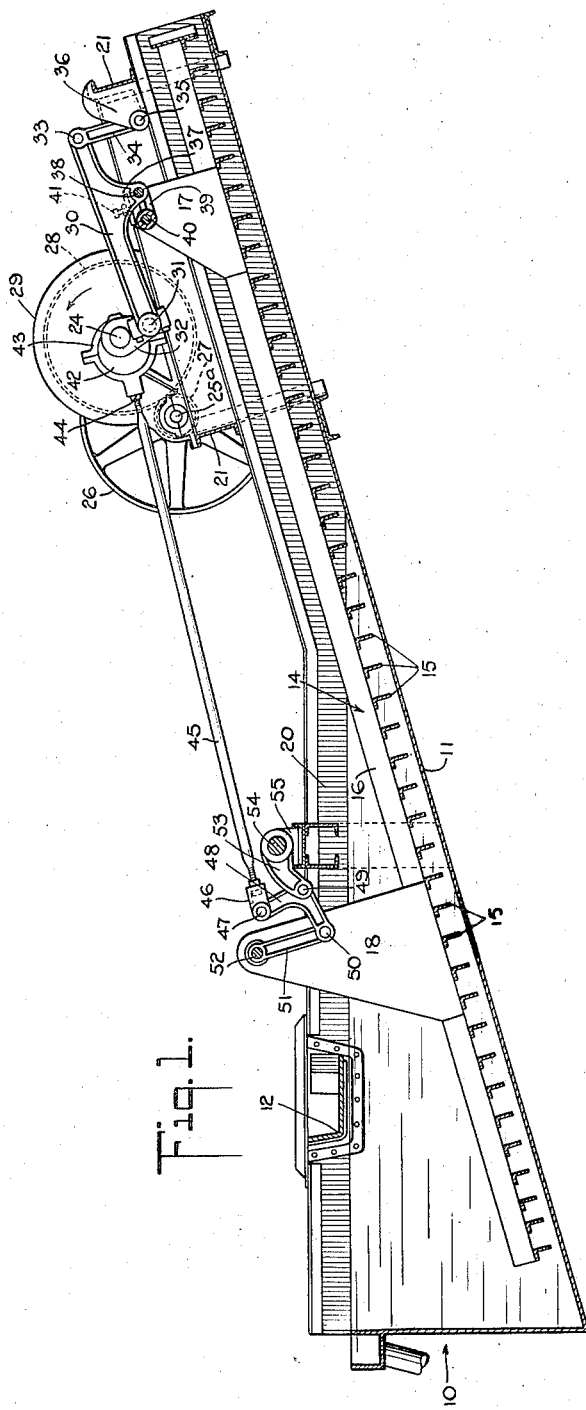

April 9, 1935.  J. H. V. FINNEY  1,997,379

CAMLESS CLASSIFICATION APPARATUS

Original Filed Oct. 21, 1930

INVENTOR
John H. V. Finney
BY Geo. J. Hyde
ATTORNEY

Patented Apr. 9, 1935

1,997,379

UNITED STATES PATENT OFFICE 1,997,379

CAMLESS CLASSIFICATION APPARATUS

John H. V. Finney, Denver, Colo., assignor, by mesne assignments, to The Dorr Company, Inc., New York, N. Y., a corporation of Delaware Application October 21, 1930, Serial No. 490,203
Renewed February 10, 1934

15 Claims. (Cl. 198—224)

This invention is directed to improvements in apparatus of the type employed for instance in wet classifiers for conveying settled solids along a deck, and is in many respects an improvement of the arrangement disclosed in United States Patent to Stokes No. 1,595,583 issued August 10, 1926.

The invention is particularly adapted to the kind of machine in which movements are imparted to the rake at two motivating points by a link system driven by eccentric means or cranks, as distinguished from cam driven classifiers. In the type of machine according to this invention, the rake member is continually suspended from the controlling link system, and is given a predetermined cyclic movement consisting of a rectilinear feedstroke and an elevated return stroke.

This invention aims to produce a camless rake actuating mechanism in which the individual component movements which go to make up the peculiar D-shaped movement of the rake as a whole, are derived separately from eccentric members suitably arranged upon a common drive shaft.

The principal advantages sought for in the camless machine lie in the smoother and more precise operation at higher speeds, reduced wear and tear, and consequently a greater longevity of a machine which must submit to heavy duty and rough handling.

Classifier rake mechanisms are generally very heavy and put considerable strain on the supporting and driving parts. It has been a problem in the development of these machines to control the effect of the masses and stresses, jerks and vibrations, liable to occur with reciprocating mechanisms. This problem becomes vital when it is desired to operate the machine at higher speeds in order to have available a higher raking capacity.

The trend for higher raking speeds is due, in one important application of the machine, to the desire to maintain higher circulating loads and the making of coarser separations at the primary classification stage in closed circuit grinding. The classifier according to this invention is fit to meet this requirement in that it will smoothly and quietly run at higher speeds than heretofore feasible.

According to one feature movements are imparted to the rake at two motivating points by means of eccentrics or crank driven links in which the movements of the said points are derived directly and separately from a main driving shaft.

The above mentioned Stokes patent discloses a classifier having a rectangular tank with a sloping bottom, adapted to receive a continuous feed of pulp comprised of solid particles of various sizes suspended in liquid. The finer particles and the bulk of the liquid overflow at the lower end of the tank, while the coarser solids settle and are raked upwardly along the bottom, to discharge over its upper end, by a rake which moves in a straight line along the bottom toward the discharge during its feed stroke, and is then lifted and returned to its initial active position during the return stroke. This movement is imparted to the rake by a mechanism including a supporting and driving bar extending longitudinally above the upper end of the rake, connected at one end to a crank and at the other end (in one form) to the top of a rocker arm, the rake being suspended from an intermediate point in the longitudinal drive bar. By properly proportioning the components of this linkage as set forth in said patent the longitudinal or driving bar will impart to the rake a movement of the desired type in which the advance or feed stroke follows a substantially rectilinear path along the bottom of the classifier, with a return movement substantially above the path, and a comparatively rapid ascent and descent respectively at the ends of said path.

To produce the necessary movement throughout the entire length of the rake a similar vertical movement is imparted to the rake at a second point of suspension toward its lower end. This point is controlled in the patented arrangement through an upwardly extending arm on the drive bar connected by a reach rod to a bellcrank from which the lower part of the rake is suspended. This arrangement throws a very large part of the weight and inertia of the rake structure on the drive bar, and requires the use of a reach rod extending a substantial distance above the mechanism at the upper end in a position that is frequently inconvenient. A general object of this invention is to eliminate these difficulties by providing a construction in which the drive bar is free from the weight and inertia transmitted from the lower portion of the rake through its supporting bellcrank, at the same time providing a construction in which the support and drive for the upper part of the rake is entirely free from obstruction and interference by the drive of the lower portion.

In accomplishing this object it has been necessary to provide a separate mechanism imparting vertical movement to the lower part of the rake which is accurately homologous to and synchronous with the vertical movement imparted to the upper part of the rake by the drive bar mechanism disclosed in said Stokes patent. This invention involves the provision of a new and separate mechanism accomplishing this result without the use of cams, which are in general objectionable in this type of machinery.

Figure 2:
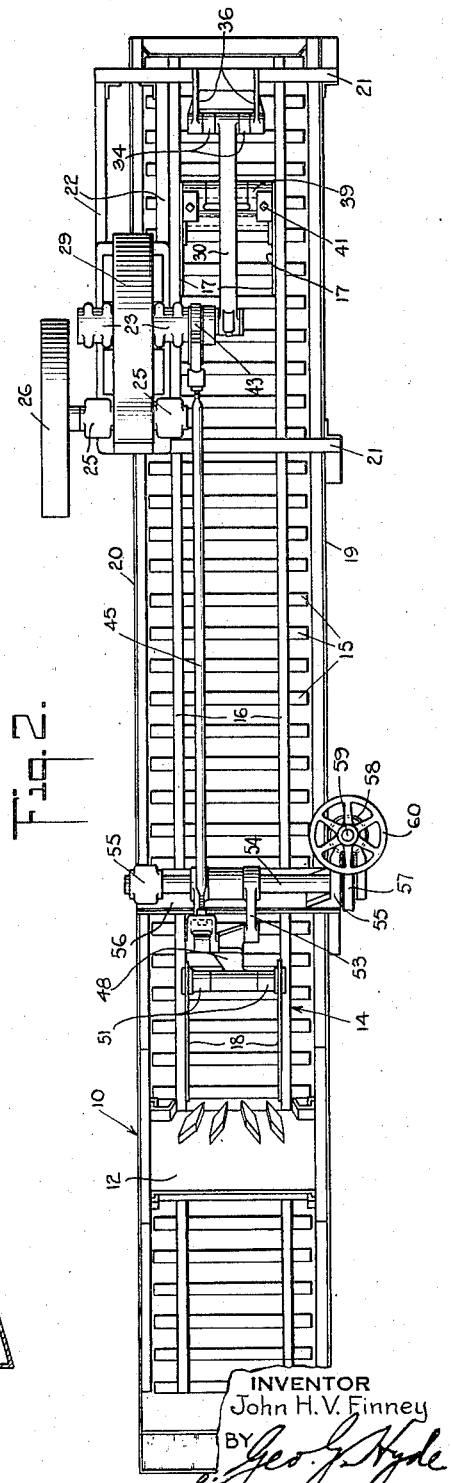

Other objects and advantages, including improvements in simplicity and compactness which greatly facilitate the design, will be apparent in the following description taken in connection with the accompanying drawing in which Fig. 1 is a side elevation of a preferred embodiment of the invention, the side wall of the classifier tank and adjacent parts being broken away; and Fig. 2 is a plan view thereof.

In general the objects are accomplished by supporting and driving the rake structure at one suspension point by mechanism of the drive bar type disclosed in the above mentioned patent, and imparting to the rake structure at a second point of suspension a homologous vertical component of movement through a novel linkage directly driven synchronously from a drive shaft, which may be the drive shaft that actuates the drive bar connected to the first mentioned suspension point. Broadly, the linkage which imparts vertical movement to the second suspension point is of any desired type adapted to impart cyclic vertical movement at a substantially harmonic rate, and connecting means between such drive and the point of suspension of the rake adapted to produce an arcuate path of movement along which the point of suspension reciprocates as the rake is reciprocated by the drive bar. With this arrangement the superposition of such arcuate movement and harmonic vertical movement will produce a path for the suspension point homologous to that of the other suspension point, thereby assuring uniform movement of the entire rake structure in the desired path.

The arcuate path of the second suspension point is preferably produced by a rocker arm corresponding to the rocker arm employed to support the drive bar in the construction shown in the above mentioned patent; and the harmonic vertical movement of the second point of suspension is preferably provided by connecting the rocker arm or its equivalent to an eccentric or its equivalent, preferably through suitable linkage. By mounting such eccentric on the drive shaft that actuates the drive bar, complete synchronism is assured.

An illustrative embodiment of the invention is shown in the drawing. In this construction the usual rectangular classifier tank 10 having a sloping bottom 11, feed trough 12 and overflow outlet is provided with a rake structure 14 including transverse rakes 15 mounted on longitudinal beams 16 suspended from hanger plates 17 near the upper end and similar plates 18 near the lower end of the rake structure 14. Extending across the side walls 19 and 20 of the tank 10 near the upper end thereof are beams 21 connected by beams 22 to form a frame on which are mounted bearings 23 and 25 for the drive shaft 24 and pulley shaft 25a respectively, the latter carrying pulley 26. Pinion 27 on the pulley shaft 25a drives shaft 24 through gear 28 housed in casing 29.

The drive bar 30 is pivoted at one end to pin 31 on crank 32 mounted on shaft 24, and at the other end is connected by a pivot pin 33 to the rocker arms 34 whose lower ends are pivotally supported by pin 35 from bracket 36 mounted on the upper beam 21. A short downward extension of the drive arm 30 carries a pivot pin 38 passing through short adjusting links 39 pivoted at their other ends through pin 40 to the hanger plates 17.

The latter carry adjusting screws 41 bearing on the upper faces of the links 39 to vary within relatively narrow limits the distance between the upper rake blades 15 and the bottom 11 of the tank.

As indicated, the arrangement for imparting the desired cyclic vertical movement to the lower part of the rake structure 14 includes broadly means for causing the lower suspension point to travel in an arcuate path, and means for superimposing substantially harmonic vertical movement on the travel of said point along the path, the arcuate and the harmonic vertical movements being synchronized so that the lower half of the harmonic motion will be simultaneous with movement along the entire length of the arcuate path in the advance or feed stroke direction, while the upper half of the harmonic movement will be simultaneous with movement along the arcuate path in the return direction. In the form illustrated the vertical movement is imparted by an eccentric 42 mounted on a shaft which in this instance is drive shaft 24. The eccentric 42 is connected to the rake structure 14 through eccentric strap 43 having adjustable threaded connection 44 with the reach rod 45 having likewise a thread-and-nut adjustable connection 46 with the pivot 47 at the upper end of bellcrank 48 which rocks on the fixed pivot 49 and carries the rake structure through suitable connections with the pivot 50 at the other end of the bellcrank. This linkage is adapted to impart suitable vertical harmonic movement. The arcuate movement is produced through rocker arms 51 pivoted to the bellcrank 48 at their lower ends through the above mentioned pivot 50, and at their upper ends to the hanger plates 18 through pivots 52.

If desired, suitable means for raising and lowering the lower portion of the rake structure 14 may be employed, as by mounting the fixed pivot 49 on the outer end of lifting arms 53 carried on transverse shaft 54 held in bearings 55 on a cross beam 56 carried by the side walls 19 and 20 of the tank. A worm gear 57 on an outboard end of shaft 54 is driven through worm 58 on vertical shaft 59 carrying hand wheel 60.

In constructing and arranging this mechanism certain relationships must be observed. The proportions necessary for the drive bar 30 and its connections are set forth in the above mentioned patent. For synchronous operation the eccentric 42 should be set on shaft 24 rearwardly of crank 32 at 90° therefrom plus or minus a small determinate angle. This angle represents the angle between a line from the center of shaft 24 to the center of pivot 47 positioned so that the lower arm of bellcrank 48 is parallel to the bottom 11, and a line from said center of shaft 24 parallel to the tank bottom 11, both lines being of course in a vertical plane at right angles to shaft 24. If the line from the pivot center 47 is above the line parallel to the bottom, the resulting angle is added to 90° in determining the offset of eccentric 42; if it is below, then the resulting angle is subtracted from 90°. The angle between the arms of the bellcrank should be the same as that between crank 32 and eccentric 42. Rod 45 should be adjusted in length so that the lower arm of bellcrank 48 between the centers of pivots 49 and 50 will be parallel to the bottom 11 when the crank 32 is parallel to said bottom. The arms of bellcrank 48 are illustrated as equal; but their proportion can be varied in connection with the throw of eccentric 42 quite substantially as long as the resulting vertical movement imparted to the pivot 50 is the same as that imparted to the pivot 38.

It has been found that the rake movement will be most satisfactory when the hanger link 51 is approximately two and a quarter times the length of the throw of crank 32. Hanger links or rocker arms 51 and 34 should of course be arranged so that they are substantially parallel to assure homologous action.

While reference is made to conveying in the specification and claims, it will be understood that this term is used for convenience to indicate not only ordinary conveying but also analogous operations, such as rabbling or the like in which an operative element receives a substantial rectilinear advance stroke and an elevated return stroke. Further, while the claims refer to vertical movement, it is understood that with other types of machines such movement need not necessarily be vertical, as long as it is transverse to the path of the rakes or other operating elements.

It will be apparent that the invention in its broader phases may be embodied in different constructions and arrangements. The form shown is therefore to be considered fundamentally as an illustration of one preferred embodiment, and the invention is not limited to the precise disclosure except as defined in the claims.

I claim:

1. In a conveying apparatus including a rake structure, a camless rake actuating mechanism including a drive shaft and a link system operatively connected to said drive shaft for imparting to the rake structure at one point cyclic movement consisting of a rectilinear feed stroke and an elevated return stroke, and a separate link system also operatively connected with said drive shaft for imparting to the rake structure at a second point homologous vertical movement, said separate link system including an eccentric and linkage and lever mechanism for imparting substantially harmonic vertical movement and also including a rocker arm pivotally mounted at its lower end on a movable end of an arm of the lever mechanism and pivotally connected at its upper end to said second point of the rake structure, to which rocker arm said harmonic movement is imparted and which rocker arm superimposes relative movement in the arcuate path upon said harmonic movement.

2. Conveying apparatus including a rake structure, a camless rake actuating mechanism including means for imparting to the rake structure at one point cyclic movement consisting of a rectilinear feed stroke and an elevated return stroke, said means including a drive bar to which the rake is connected at said point, a crank operatively connected to one end of the drive bar, and a rocker arm pivoted at its upper end to the drive bar; and separate means for imparting to the rake structure at a second point homologous vertical movement including means for applying to said second point substantially harmonic vertical movement and a rocker arm for superimposing thereon relative movement in an arcuate path, said rocker arm connected by its upper end to said second point and to which rocker arm the substantially harmonic movement is imparted, the resultant of the harmonic and arcuate movements producing a path for said second point homologous to that of the first point for uniform movement of the entire rake structure.

3. In a conveying apparatus including a rake structure, means for imparting to the rake structure at one point cyclic movement consisting of a rectilinear feed stroke and an elevated return stroke, said means including a drive bar to one section of which the rake is connected at said point, a crank operatively connected to one end or second section of the drive bar, and a rocker arm pivoted at its upper end to another or third section of the drive bar, and separate means for imparting to the rake structure at a second point homologous vertical movement, said separate means including an eccentric for applying to said second point substantially harmonic vertical movement and means positioned by said eccentric and carrying a rocker, the upper end of which is connected to said second point of the rake structure and is provided for superimposing on the means that is positioned by said eccentric a relative movement in an arcuate path, the resultant of the harmonic and arcuate movements producing a path for said second point homologous to that of the first point for uniform movement of the entire rake structure.

4. Conveying apparatus including a rake structure, a drive bar from which the rake structure is suspended at one point, a crank connected to one end of the drive bar, a rocker arm pivoted at its upper end to the drive bar, a second rocker arm pivoted at its upper end to the rake structure at a second point substantially spaced from the first mentioned point, an eccentric operatively connected to the second rocker arm, and drive means for imparting synchronous movement to said crank and eccentric.

5. Conveying apparatus including a rake structure and means for imparting to the rake structure at one point cyclic movement including a rectilinear feed stroke and an elevated return stroke, comprising a rocker arm pivoted at one end to the rake structure at said point, means for imparting bodily up and down movement to said rocker arm, including an eccentric member, a drive shaft carrying said eccentric member, a bellcrank on which the rocker arm is mounted, and a reach rod to make direct operative connection between said eccentric member and said bellcrank, and means for longitudinally reciprocating the rake structure controlled from said drive shaft.

6. Conveying apparatus including a rake structure and means for imparting to the rake structure at one point cyclic movement including a rectilinear feed stroke and an elevated return stroke, comprising a rocker arm pivoted at its upper end to the rake structure at said point, an eccentric operatively connected to the rocker arm to impart vertical movement thereto, and means for reciprocating the rake structure.

7. Conveying apparatus including a rake structure, means for imparting to the rake structure at one point cyclic movement including a rectilinear feed stroke and an elevated return stroke, and means for imparting to the rake structure at a second point homologous vertical movement including a rocker arm pivoted at its upper end to the rake structure at the second point, a bellcrank on which the rocker arm is mounted, an eccentric and an actuating connection between the eccentric and the bellcrank.

8. Conveying apparatus including a rake structure having two motivating points longitudinally spaced thereon, a camless rake actuating mechanism including a rake structure, a drive shaft, means including a link system operatively connected to said drive shaft through an eccentric member for imparting to the rake structure at one motivating point cyclic movement consisting of a rectilinear feed stroke and an elevated return stroke, and another link system forming an operating connection between said drive shaft and the second motivating point upon the rake structure through another eccentric member upon said shaft, the arrangement being such as to correlate the movement of the second point to the movement of the first point, producing uniform movement of the entire rake structure, the drive shaft being located intermediate the two link systems, the latter of which extend in opposite directions to the two rake motivating points.

9. A conveying apparatus comprising a rake structure, a master operating and positioning mechanism and a follower control mechanism, said master operating and positioning mechanism comprising a main crank revolvable about a transversely extending axis and a bodily movable drive bar which is actuated and in part carried by said crank and which drive bar in turn carries and drives one section of the rake structure so as to impart a forward longitudinal movement along a lower path and a return movement along an upper path of the rake structure and the requisite vertical movements to the section of the rake structure which is carried by and from said drive bar, which said follower control mechanism comprises an eccentric operable about a transversely extending axis, rocker member that provides means for supporting at its upper end a second or longitudinally spaced section of the rake structure, and an intermediate mechanism actuated from and by said eccentric and which in turn carries the lower end of the rocker and which positions said rocker in such a manner that as the rake structure is longitudinally reciprocated by the master operating and positioning mechanism said second section of the rake structure is transversely moved and supported by said link which in turn is transversely moved and compensatingly positioned by said intermediate mechanism operating under the influence of said eccentric whereby said second section moves in a cyclic path which is homologous to or substantially symmetrical with the cyclic path of the first section.

10. A conveying apparatus as defined in and by the claim last preceding in and according to which the eccentricity of the crank is considerably greater than the eccentricity of the eccentric and in which the angular disposition of the effective cranks of the eccentric and the main crank approaches but is slightly away from 90 degrees in respect to each other.

11. A conveying apparatus including a tank having a material supporting bottom, upon said tank and operatively associated with and along said bottom an oscillating or reciprocating rake structure having successive cyclic movements each of which comprises a lower feed stroke and an elevated return stroke, and means for imparting said movements to said rake structure, which said means comprises a main drive shaft carrying a crank element, a drive rod in the form of a floating or bodily movable lever having one portion connected to, supported by and driven by the crank element and having a fulcrum support constructed so that the fulcrum point of the lever is changeable according to requirements incident to the general bodily movement of the lever as driven by the crank arm as it is rotated, a link having one end connected to a third portion of the bodily movable lever and the other end connected to the rake structure so that the general forward movement at one time and rearward movements required for the rake structure and so that the rise at one time and the descent at another time of the section of the floating lever to which the link is connected effects and controls through the medium of said link the required rise and descent of that portion of the rake structure which is supported from the said lever through the medium of said link.

12. A conveying apparatus as defined in and by claim 11 wherein an adjustable member is provided between said rake structure and said link to adjust the lowermost position which that portion of the rake structure that is supported by the link can assume as the conveying apparatus functions.

13. A conveyor as defined in and by claim 11 wherein a second portion of the rake structure—and which second portion is longitudinally spaced from that portion of the rake structure which is connected by means of the aforementioned link to the bodily movable lever—is operatively supported by means under the control of another lever and link mechanism wherein the parts are arranged so that the portion of the rake structure supported thereby has cyclic movements that are correlated with the cyclic movements imparted to that portion of the rake structure that is supported by and from the bodily movable lever, thus providing for relatively uniform movement of the entire rake structure.

14. In a conveying apparatus wherein there is a rake structure that is located over a bottom or floor upon which material is supported and along which the material is longitudinally fed by step by step movements as the rake structure is actuated, and means for actuating the rake structure so that each section thereof passes through successive cyclic movements each of which comprises a lower feed stroke and an elevated return stroke; which said means comprises a transversely extending drive shaft, a crank carried by and driven by said shaft, a bodily movable drive bar having one or a first section thereof that is supported from and by said crank, means for supporting another or second section of the drive bar—which said second section is longitudinally spaced with respect to said first section—so that the drive bar can have bodily longitudinal reciprocation as the first mentioned section of the drive bar is driven and supported by said crank as it rotates, and an adjustable means by which one section of the rake structure is supported from a third section of said bodily movable drive bar whereby according to the adjustment of said last mentioned means the lowest position of the thus carried section of the rake structure relative to the floor can be determined.

15. A conveying apparatus as defined in and by claim 14 and according to which the adjustable means comprises a link arranged to permit an upward yielding of the rake structure relative to the floor but which through the medium of an adjusting screw cooperatively associated with the link determines the lowermost position relative to the floor of the section of the rake structure carried through the medium of the link.

JOHN H. V. FINNEY.